Jan. 22, 1929.  R. T. PIERCE  1,699,807
ELECTRICAL MEASURING INSTRUMENT
Filed Nov. 7, 1927
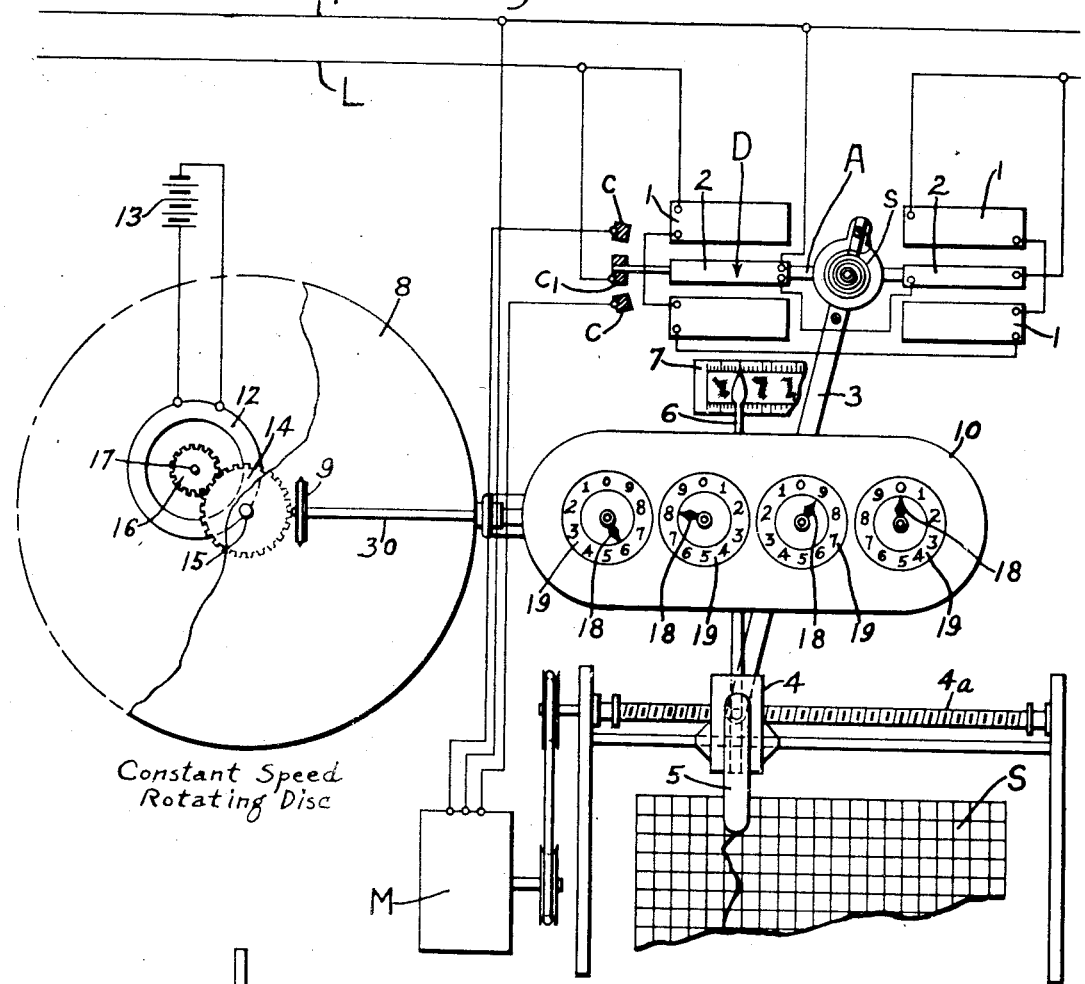
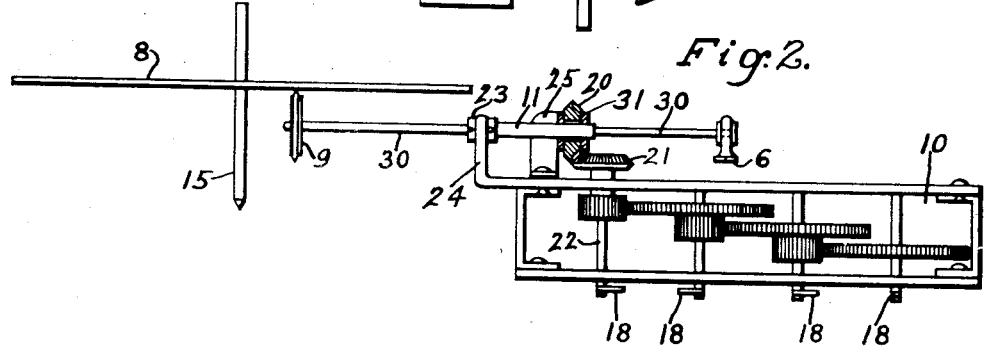
WITNESSES:
R. S. Williams
B. R. King
INVENTOR
Raymond T. Pierce
BY
Wesley G. Carr
ATTORNEY Patented Jan. 22, 1929.

1,699,807

UNITED STATES PATENT OFFICE.

RAYMOND T. PIERCE, OF MILLBURN, NEW JERSEY, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed November 7, 1927. Serial No. 231,502.

My invention relates to measuring instruments or apparatus and particularly to those involving the measurement of the magnitude of an electrical quantity.

My invention resides in apparatus for integrating or totalizing a quantity, such as amperes or watts traversing an electrical circuit while said quantity is graphically recorded by an instrument constructed for that purpose, and it is characteristic of my apparatus for that purpose that it is extremely accurate and may be mechanically associated with indicating or recording instruments without materially affecting the mechanical construction or substantially varying the relation between the component parts of the same.

It is further characteristic of my invention that an integrating or totalizing device is actuated by a source of power separate from the power derived from the torque actuating the movement of the recording or indicating device. The indicating or recording device performs the function of varying the relative position between the driving and driven members with respect to each other to thereby vary the rate of advance of the integrating device in accordance with the magnitude of the quantity traversing said indicating or recording instrument.

My invention resides in the apparatus and features of construction of the character hereinafter described and claimed, the foregoing and further characteristics of my invention being determinable from the following description.

For description of one form my apparatus may take, reference is to be had to the accompanying drawing in which, Figure 1 is a view, partially diagrammatic and partially elevational, of a portion of a recording instrument having apparatus associated therewith constructed in accordance with my invention; and Fig. 2 is a top plan view of a portion of the device shown in Fig. 1.

Referring to Fig. 1, there is illustrated a deflecting system D, comprising a plurality of fixed coils or windings 1 and a plurality of movable coils 2 coacting therewith. In the example shown, coils 1 are connected in series with an electrical circuit comprising the conductors L, L$_1$ while the coils 2 are connected across said circuit.

A suitable motive device, as an electrical motor M, has the common terminal of its windings connected to the conductor L$_1$ while the other terminals of its windings are connected, respectively, to fixed contacts C, C with which coacts a movable contact C$_1$ connected to the conductor L. Contact C$_1$ is carried by a pivoted arm A supporting the aforesaid movable coils 2, 2.

A member or link 3 movable with the aforesaid pivoted arm terminates in a translatory member or device 4 which, in the example illustrated, is threaded to a suitably supported rod 4$_a$ adapted to be rotated in opposite directions by the motor M. Carried by the member 4 is a stylus or record-forming member 5 coacting with a suitable moving record-receiving surface S. Member 4 may also have a pointer 6 projecting therefrom which coacts with a suitable scale 7.

The aforesaid arrangement, when connected as illustrated, operates to produce one or more effects varying in accordance with the magnitude of the electrical power or watts of the circuit comprising the conductors L, L$_1$. Upon increase in power, the movable coils 2, 2 swing in one direction to close a circuit through the motor M at contact C$_1$ and one of the contacts C. As a result, member 4 is moved in one direction along the threaded rod 4$_a$, the pointer 6 indicating instantaneous values of the electrical power, and the stylus 5 forming a curve on the member S likewise indicative of said instantaneous values. Operation of the motor M continues until movement of the link 3 through the interposed spring S causes sufficient movement of the pivoted arm A supporting the coils 2, 2 to break the circuit described above. In the event that the power decreases, the movable coils swing in a direction the reverse of that described above with consequent operation of motor M and movement of member 4 in a reverse direction.

In accordance with my invention, to integrate or totalize a quantity, such as the power traversing the conductors L and L$_1$, I provide a constantly rotating member, such as a disc 8, that drives a member or wheel 9 that is suitably connected to an integrating device, for example, a recording train 10.

In accordance with my invention, the rotative speed of the wheel 9 is varied in accordance with the magnitude of power or other quantity. To this end, the radial position of the wheel 9, with respect to the center of the disc 8, is controlled by the translatory member 4 and, as one arrangement for accomplishing this purpose, I utilize a member 30 disposed within a rotatable member 11, the latter rotating in response to rotation of the member 30. This function may be produced in any suitable manner, but I prefer that the member 30 shall comprise a substantially square portion coacting with a substantially square chamber within the member 11. Member 30 is connected to pointer 6, Fig. 2, and hence partakes of any movement imparted to the translatory member 4.

The rotating member or disc 8 may be driven at a constant speed by any suitable means, for example, by a constant-speed motor 12 that is energized by a source of supply, such as a battery 13. The constant-speed motor 12 may be a synchronous motor connected to the conductors L and $L_1$, or the motor 12 may be a spring-driven motor of any well-known type. The constant-speed motor 12 drives the rotating member 8 through suitable reducing gears, as, for example, a gear wheel 14 secured to the shaft 15 of the rotating member 8 and a gear wheel 16 secured on the shaft 17 of the armature of the constant-speed motor 12.

The gear train 10 is provided with pointers 18 that move over the faces of dials 19 so that the total number of rotations of the wheel 9 are determinable by the relative positions of the pointers 18 with respect to the dials 19.

The gear train 10 may be driven in any suitable manner in accordance with the revolutions of the wheel 9, for example, by transmission of the turning motion of the member 11 to a bevel gear wheel 20 that meshes with a gear wheel 21 mounted upon a shaft 22 of the pointer 18.

The rotating member 11 may be provided with collars 23 to prevent relative lateral motion thereof with respect to a supporting member 25. The rotating member 11 may drive the gear wheel 20 through a key 31, or other suitable means.

While I have shown the relatively rotatable members 8 and 9 in the form of a disc and wheel, they may be made in any form suitable to accomplish the desired purpose, that is, the development of a rotative speed of the wheel or member 9 proportional to the magnitude of some quantity. Also, while I have shown the integrating or totalizing train 10 mounted between the indicating pointer 6 and the stylus 5, it may be located in any other suitable or desirable position.

Various other changes and modifications may be made in my invention, and I desire that all such changes and modifications shall be included within the spirit and scope of the appended claims.

I claim as my invention:

1. The combination with a plurality of directly coacting rotatable members movable with respect to each other, and means for rotating one of said members at constant speed, of means for varying in accordance with changes in electrical power the position of another of said members with respect to said one member comprising a motive device connected to said other member, and means including an electrical power circuit for operating said motive device.

2. The combination with a plurality of directly coacting rotatable members movable with respect to each other, and means for rotating one of said members at constant speed, of means for varying in accordance with changes in the wattage magnitude of an electrical circuit the position of another of said members with respect to said one member comprising a motive device connected to said other member, and means for alternately actuating said motive device in opposite directions with changes in the power being measured.

3. The combination with a plurality of directly coacting rotatable members movable with respect to each other, and means for rotating one of said members at constant speed, of means for varying in accordance with changes in the wattage magnitude of an electrical circuit the position of another of said members with respect to said one member comprising a reversible motor connected to said other member, and a deflecting system for operating said motor, said system deflecting in one direction to operate said motor in one direction and deflecting in reverse direction to operate said motor in reverse direction.

4. The combination with a plurality of directly coacting rotatable members movable with respect to each other, and means for rotating one of said members at constant speed, of means for varying in accordance with the wattage magnitude of an electrical circuit the position of another of said members with respect to said one member comprising a reversible motor, a connection between said motor and said other member, a translatory device in said connection, an indicating member controlled by said translatory device, and a deflecting system for operating said motor, said system deflecting in one direction to operate said motor in one direction and deflecting in reverse direction to operate said motor in reverse direction.

5. The combination with a plurality of directly coacting rotatable members movable with respect to each other, and means for rotating one of said members at constant speed, of means for varying in accordance with the wattage magnitude of an electrical circuit the position of another of said members with respect to said one member comprising a reversible motor, a connection between said motor and said other member, a translatory device in said connection, indicating and recording members controlled by said translatory device, and a deflecting system for operating said motor, said system deflecting in one direction to operate said motor in one direction and deflecting in reverse direction to operate said motor in reverse direction.

In testimony whereof, I have hereunto subscribed my name this 6th day of October 1927.

RAYMOND T. PIERCE.